US012083529B2

(12) United States Patent
Van Zyl et al.

(10) Patent No.: US 12,083,529 B2
(45) Date of Patent: Sep. 10, 2024

(54) PROTECTIVE LINER FOR CRUSHER

(71) Applicant: Metso Outotec Finland Oy, Tampere (FI)

(72) Inventors: Ian Van Zyl, Baldivis (AU); Henrik Persson, Trelleborg (SE)

(73) Assignee: Metso Outotec Finland Oy, Tampere (FI)

( * ) Notice: Subject to any disclaimer, the term of this patent is extended or adjusted under 35 U.S.C. 154(b) by 383 days.

(21) Appl. No.: 17/599,638

(22) PCT Filed: Apr. 1, 2020

(86) PCT No.: PCT/EP2020/059239
§ 371 (c)(1),
(2) Date: Sep. 29, 2021

(87) PCT Pub. No.: WO2020/201346
PCT Pub. Date: Oct. 8, 2020

(65) Prior Publication Data
US 2022/0161266 A1 May 26, 2022

(30) Foreign Application Priority Data
Apr. 4, 2019 (EP) .................................... 19167370

(51) Int. Cl.
*B02C 2/00* (2006.01)
*B02C 17/22* (2006.01)

(52) U.S. Cl.
CPC ............ *B02C 2/005* (2013.01); *B02C 17/225* (2013.01); *B02C 2210/02* (2013.01)

(58) Field of Classification Search
CPC ....... B02C 2/005; B02C 17/22; B02C 17/225; B02C 2210/02
See application file for complete search history.

(56) References Cited

U.S. PATENT DOCUMENTS 4,065,064 A * 12/1977 Anthony ................. B02C 2/005 241/300
2001/0045476 A1* 11/2001 Washburn ............... B02C 2/005 241/207

(Continued)

FOREIGN PATENT DOCUMENTS

SU 1668591 A1 8/1991
SU 1738343 A1 6/1992

(Continued)

OTHER PUBLICATIONS

Examination Report for Corresponding Australian Patent Application No. 2020250883 dated Jul. 1, 2022.

(Continued)

*Primary Examiner* — Mohammed S. Alawadi
(74) *Attorney, Agent, or Firm* — Andrus Intellectual Property Law, LLP

(57) ABSTRACT

A crusher having a protective liner, the protective liner including a plurality of lining segments which are arranged circumferentially along an a of the crusher. At least some of the segments have a trapezoidal shape with two bases of different lengths arranged parallel to the circumferential direction of the wall and two non-parallel legs connecting the bases. Further, at least some of the segments are arranged along the circumference of the wall such that long and short bases of adjacent segments alternate, and wherein at least some of the segments are allowed to vary in their axial position with respect to adjacent segments to compensate for tolerances in diameter of the wall of the crusher.

19 Claims, 6 Drawing Sheets

(56) References Cited

U.S. PATENT DOCUMENTS

| | | | | |
|---|---|---|---|---|
| 2015/0283549 | A1* | 10/2015 | Malmqvist | B02C 2/005 241/207 |
| 2021/0237093 | A1 | 8/2021 | Archie | |

FOREIGN PATENT DOCUMENTS

| | | | |
|---|---|---|---|
| WO | 2001058594 | A1 | 8/2001 |
| WO | 2017198309 | A1 | 11/2017 |

OTHER PUBLICATIONS

International Search Report and Written Opinion for International Application No. PCT/EP2020/059239 mailed May 11, 2020.

* cited by examiner

PROTECTIVE LINER FOR CRUSHER

CROSS-REFERENCE TO RELATED APPLICATIONS

This application is the U.S. national stage application of International Application PCT/EP2020/059239, filed Apr. 1, 2020, which international application was published on Oct. 8, 2020, as International Publication WO 2020/201346 A1 in the English language. The International Application claims priority of European Patent Application No. 19167370.6 filed Apr. 4, 2019.

BACKGROUND OF THE INVENTION

Field of the Invention

The present invention relates to a protective liner in a crusher, and to a method of assembling the same.

Description of the Related Art

Crushers are generally used for disintegrating solid materials, such as ore, minerals, and scrap metal. In many cases, crushers are used for an upstream-processing in order to prepare the materials to be processed in a later step.

Common types for crushers are gyratory crushers, that is, crushers that comprise a crushing head mounted upon an elongate main shaft that is disposed in the inside of a round casing. A first crushing surface is present on the crushing head, and a second crushing surface is provided on an inside of the casing, such that the first and second crushing surfaces define together a crushing chamber through which the material to be crushed is passed. In many cases, a driving device positioned at a lower region of the main shaft is configured to rotate an eccentric assembly positioned about the shaft to cause the crushing head to perform a gyratory pendulum movement and crush the material in the crushing chamber. It is to be noted that this invention is not limited to gyratory crushers, but can be applied to several types of crushers such as, for example, cone crushers.

Typically, both the inner and outer crushing surfaces wear and distort due to the significant pressures and impact loading forces they transmit. Therefore, liners are provided inside such crushers, which serve as a surface that has a higher resistance against shear than the housing of the device, which is typically made of metal. Such liners have the advantage that they can easily be replaced when worn down, such that it is only the liners that need to be changed from time to time, leaving the housing intact. Therefore, the liner needs to be provided such that it can be easily mounted to and detached from the housing.

In the technical field, the liners currently used are often assembled using a plurality of individual, identical rectangular plates which are dimensioned in accordance with the size, in particular the diameter, of the housing to be provided with the liner. However, there is a problem that the diameter of the crusher varies. This variation in diameter can be caused for example by production tolerances or by wear or damage to the crusher during use. Deviations in the diameter and, thus, in the circumference to be covered by the liner, therefore often result in a problem that the liners do not precisely fit into the housing. If the circumference of the housing is larger than its nominal value, e.g. 1600 mm, there remains a gap between two segments of the liner, whereas, if the circumference of the housing is smaller than its nominal value, the segments of the liner at least partially have to be cut in order to fit on the wall of the housing. It is to be noted that any measurements or dimensions provided herein are purely exemplary and the invention is not limited to any dimensions, unless explicitly recited in the independent claims.

Since the liner material is designed to be abrasion resistant and very hard, cutting the segments of the liner to size is usually difficult. Hence, a problem of the prior art is that a protective liner for a crusher, the liner comprising a plurality of lining segments which are arranged circumferentially along a wall, e.g. a cylindrical wall or conical wall, of the crusher, is difficult to precisely assemble in case of dimensional variations, in particular tolerances, of the wall such as a varying diameter.

WO 2017/198309 A1 describes a liner for a gyratory crusher having a conical housing to be provided with a protective liner.

SUMMARY OF THE INVENTION

In view of the above, it is an objective of the present invention to provide generally a crusher having a protective liner that can easily and precisely be assembled and mounted in position. In particular, it is an objective of the present invention to provide a liner segment which overcomes the problem of gaps between adjacent liner segments or the necessity to cut liner segments to size in case of imprecise dimensions of the crusher housing.

This problem is solved by the subject-matter of the independent claims. Preferred further developments of the invention are subject to the dependent claims.

According to the present invention, there is provided a crusher having a protective liner, the protective liner comprising a plurality of lining segments which are arranged circumferentially along a wall of the crusher. At least some of the segments have a trapezoidal shape with two bases of different lengths arranged parallel to the circumferential direction of the wall and two non-parallel legs connecting the bases. At least some of the segments are arranged along the circumference of the wall such that long and short bases of adjacent segments alternate, wherein at least some of the segments are allowed to vary in their axial position with respect to adjacent segments to compensate for tolerances in diameter of the wall of the crusher. The invention is not limited to gyratory crushers.

Advantageously according to the present invention, the movement of the individual segments with respect to the axial position can be used to “fine-tune” the total circumferential length of the liner. This is achieved by the trapezoidal shape of the segments and the feature of them being arranged in an alternating fashion: If the segments are arranged such that one or several, or all of the segments are moved further in the direction of their short bases, the circumferential length of the resulting liner, that is, the ring of segments, expands, whereas the diameter diminishes, if one or several, or all of the segments are moved in the direction of the long base. This effect can be achieved when only some segments, or even only one, is moved in the axial direction relatively to the adjacent segments. This allows an arrangement in which all segments are arranged in the crusher, such as to be fit to the diameter of the inside wall of the crusher.

If and when segments of identical shape can be used, this arrangement further eliminates the need to cut any segments for fitting them into the crusher. Adjustment of the circumferential width can be achieved by moving the segments with respect to each other in an axial direction of the wall, instead of cutting the segments such that they fit to the wall without any gaps formed there-between.

Since the segments according to the invention are arranged alternately, they can accommodate a wall of the crusher. An arrangement of segments in the same orientation with respect to the bases allows for a tapered or frusto-conical structure.

Preferably, the wall of the crusher is at least partly cylindrical, but could similarly be conical or have an otherwise closed shape configuration.

While a crusher may have a wall that is non-cylindrical, for example, a frusto-conical wall, a crusher with a cylindrical wall provides the advantage that the lining segments can be assembled more easily. Additionally, in the case of a crusher with a cylindrical wall, all lining segments can be shaped identically, which reduces manufacturing costs and costs for storage of replacement parts.

In the crusher, preferably at least one of the segments is movably attached to the wall of the crusher.

This facilitates the mounting since the position of this segment can then be adjusted and then fixed easily. On the other hand other segments can be fixedly attached to the wall of the crusher so that two segments having their short bases facing upwards along the cylinder axis of the crusher can form a trapezoidal space into which the movably attachable segment can be inserted and movably attached to the wall of the crusher without any gap being formed between the mentioned three segments, and no cutting becoming necessary.

In the crusher, the legs connecting the bases are preferably rectilinear.

This allows for the segments to be sled along each other with two legs of adjacent segments being in contact with each other. Compared to an embodiment in which the legs are not rectilinear but have, for example, protrusions or recesses, this preferred feature further allows for adjusting the position of two segments relatively to each other in a continuous fashion.

In the crusher, an angle formed between the two non-parallel legs connecting the bases preferably is identical for at least three, preferably for all, of the segments of the protective liner.

This allows for the segments to be mounted in a ring fashion that is substantially orthogonal to the axis of the wall irrespective of the order of the segments having the identical angle between the non-parallel legs. Mounting the segments in a ring fashion is possible also for other choices of segments, but if all segments particularly have the same angle between the non-parallel legs, the risk of erroneous installations of the protective liner is particularly low. Most preferably, the segments of the protective liner are identical to each other.

This latter configuration allows for only a single type of segments to be produced, which reduces production costs and further facilitates mounting of the segments to form the protective liner.

The segments preferably comprise a ceramic material, and preferably comprise a blend of rubber and ceramic, such as the Trellex® Poly-Cer as described in https://www.metso.com/globalassets/saleshub/documents---episerver/brochure-trellex-poly-cer-2679-en-low.pdf.

In addition or alternatively preferably, the segments comprise a metallic material, and preferably comprise a blend of rubber and metal.

These materials can be chosen in order to improve the resistance against abrasion of the liners. While it is generally possible to provide a crusher with any material, ceramics and metal have proven to be beneficial, since ceramics show an excellent resistance to shear or wear, while metal provides for an excellent workability, and is still sufficiently resistant to abrasion and shear.

A blend of rubber and ceramic or a blend of rubber and metal has the beneficial effect that the ceramic or metallic part provides resistance to wear and shear, whereas the elastic properties of rubber effectively absorb shock impacts.

It is possible that only a part of the segment comprises the ceramic or metallic material or the blend of rubber and ceramic, e.g. Poly-Cer, or the blend of rubber and metal.

An angle formed by at least one of the legs connecting the bases and the longer one of the bases is preferably between 80° and 89°, further preferably between 83° and 88°, and most preferably equal to 86°.

The trapezoidal shape of the segments allows for the adjustment of the length of the protective liner along the circumferential direction of the wall. On the other hand, large inclinations, i.e. small angles between the longer one of the bases and the legs, are disadvantageous with respect to lining a wall due to a possible curvature of the wall and the long overlap of the inclined parts of the segments along the circumference of the wall, which results in discontinuous transitions between adjacent segments.

It has been found that the above range of angles of between 80° and 89°, and especially a range of angles of approximately 83° to 88°, and further preferably an angle of approximately 86° allows for sufficient compensation of dimensional tolerances whilst still allowing for a smooth transition between adjacent segments lining a wall.

The longer one of the bases preferably has a length of between 600 mm and 1800 mm, and/or the shorter one of the bases has a length of between 500 mm and 1000 mm.

A distance between the two bases of the segment is preferably between 200 mm and 2000 mm.

These dimensions of liner segments have proven to be particularly appropriate for crushers the wall of which has a nominal diameter of 1600 mm.

In the crusher, preferably at least one of the segments has an elongate slot for fixating the segment on a fixation member on the wall of the crusher.

Such a slot has the effect that the segment can be placed to the wall of the crusher without being fixedly, but movably attached to the wall, such that the position of the segment can be adjusted along the elongate slot. After placing the segment at a desired position, the segment can then be fixedly attached.

A fixation member for interaction with the elongate slot can, for example, be a screw, a threaded rod fixed to the crusher housing, a clamp, a bolt, a projection, or any other means known in the art. The fixation can then be achieved by screwing a nut onto the screw or the threaded rod, by fastening the clamp or other applicable means.

Preferably, the elongate slot extends substantially in a direction from the long basis to the short basis of the segment. An orientation of the elongation of the elongate slot forming an angle with respect to the bases of between 80° and 100° is considered to be substantially in the direction from the long basis to the short basis.

When the segment is arranged such that the bases are oriented orthogonal to the axial direction of the wall of the crusher, in particular if the wall is cylindrical or conical, this arrangement of the elongate slot allows the segment to be moved along said axial direction in the unfixed state and to be fixed once a desired position is reached.

In a preferred embodiment of the crusher, a diameter of the crusher is between 800 mm and 4500 mm, further preferably 1600 mm. This range has proven to be appropriate for most uses of the crusher.

Preferably, the protective liner has a cylindrical surface rather than a conical or, along the axial direction of the cylindrical wall, a concave shape.

According to the invention, there is further provided a method for assembling a protective liner in a crusher as described above. In a first step, at least two segments are attached to the wall of the crusher, such that an interval along the circumferential direction of the wall is defined between two segments of the crusher, wherein the wall is not covered by any segment in the interval. Afterwards, In a second step, a further segment is inserted into the interval and the position of the further segment is adjusted in an axial direction of the wall so that the wall of the crusher is covered with segments arranged along the circumferential direction of the wall, such that the adjacent non-parallel legs of adjacent segments at least partially contact each other.

An advantageous effect of this method is that the protective liner can be assembled in a particularly precise and still very efficient way. By attaching the at least two separated segments, the positional accuracy required for segments to precisely form a closed protective liner is less demanding than for the known method of attaching neighboring segments in sequence. The trapezoidal shape of the segments allows for compensating not only tolerances of the diameter or other dimension of the wall of the crusher, but also tolerances in mounting the segments to the wall. In other words, it is possible for the segments to be less accurately attached to the wall and to compensate for any reduced accuracy by the remaining segment or segments inserted into the interval.

In some cases, the segments can be dimensioned and designed such that a complete protective liner covering the circumference of the standard crusher is formed by a number of complete, individual segments, such that all segments are arranged flush with each other. In a tolerance-prone crusher, however, the appropriate size of the protective liner depends on the actual dimensions of the crusher.

In case of any deviation of the actual diameter of the wall from its nominal diameter or shape, the further segment can be inserted so far that any gaps between the legs of adjacent segments are reduced to substantially zero.

Similar to what has been described above, this method eliminates the need to cut any segments for fitting them into the protective liner. Adjustment of the circumferential size of the protective liner can be achieved by moving the inserted segment with respect to the other segments in an axial direction, instead of cutting the inserted segment such that it fits into the remaining interval, as would be necessary in conventional configurations of protective liners.

In a preferred method, the interval defined in the first step has an average width as measured in the circumferential direction of the wall that is larger than a length of the shorter one of the bases of the further segment and smaller than a length of the longer one of the bases of the further segment.

This ensures that the interval for inserting the further segment is sized such that it accommodates exactly one segment. If the width is narrower than the shorter base, the further segment cannot be inserted sufficiently far between the two segments; if, on the other hand, the width is larger than the longer base, the further segment does not contact the adjacent two segments in a fitting manner.

In addition or alternatively preferably, the width of the interval defined in the first step as measured in the circumferential direction of the wall half way between the long base and the short base is larger than a length of the shorter one of the bases of the further segment and smaller than a length of the longer one of the bases of the further segment.

This similarly ensures that the further segment overlaps with the adjacent segments to an extent of more than 50% of its height. This is beneficial for the structural stability of the assembly and ensures that the further segment serves to sufficiently cover the wall.

When at least one of the segments has an elongate slot for fixating the segment on a fixation member on the wall of the crusher, the method preferably further comprises a step of positioning the at least one elongate slot on at least one fixation member such that the segment having the elongate slot can be moved substantially only in the direction of elongation of the elongate slot, and fixating the segment by means of the fixation member and the elongate slot when the segment is at a desired position in the axial direction.

This allows for an adjustment of the further segment in an axial direction of the wall, such that the segment can be fixed when the segment is positioned at a desired axial position. This further allows for a fixation of the segment in the axial direction such that the gaps between adjacent segments are minimized.

In the method, in the first step, the at least two segments are preferably attached to the wall of the crusher in an orientation of the shorter ones of the two bases facing upwards along the axial direction of the wall, and the longer ones of the two bases facing downwards along the axial direction of the wall, such that the interval between the two segments is tapered downwards to hold the further segment.

While the segments can generally be arranged vice versa, that is, the interval being tapered upwards, the preferred configuration allows for gravity to assist in inserting the further segment. Additionally, the preferred configuration allows the further segment to be held in place by gravity without the need for it to be additionally secured in the axial direction of the crusher.

Further, this method allows for every second segment to be fixed inside the crusher such that there remain multiple downwardly tapered intervals, and corresponding segments can then be sled into the intervals. This is a particularly efficient way of assembling the protective liner.

All these devices and methods serve the purpose of providing a protective liner that can easily and precisely be assembled and mounted in position and in particular renders cutting of the liner segments unnecessary.

DETAILED DESCRIPTION OF PREFERRED EMBODIMENTS

Figure 1:
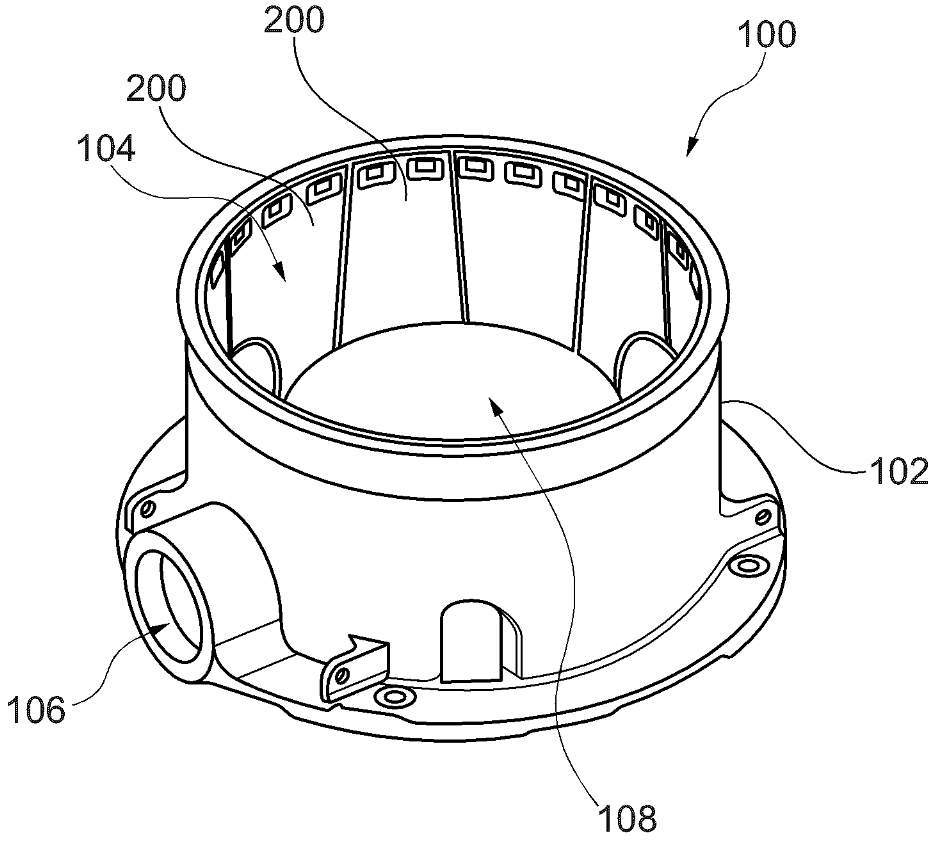
FIG. 1 is a perspective view of a part of a crusher according to a preferred embodiment.

In the following, an exemplary embodiment of the present invention will be described with reference to the attached Figures, wherein same reference numerals refer to same or corresponding features or elements.

FIG. 1 is a perspective view of a part of a crusher according a preferred embodiment. For the ease of understanding, only the housing is depicted, leaving out the crushing head and any accessory parts.

The crusher 100 generally comprises a housing 102 that consists of any material known in the art, such as cast iron. The housing 102 may have a nominal inside diameter of X, but could equally have other diameters. Especially when using cast iron, the diameter of the housing 102 has a tolerance of, for example, 20 to 30 mm, that is, the actual diameter of the housing 102 may be in the range of between X+/−30 mm. The inside of the crusher housing 102 shown in FIG. 1 is essentially cylindrical with ports 106 in the circumference to allow for accessing the crushing chamber 108 from the side.

On the inside, the housing 102 according to the preferred embodiment shown in FIG. 1 is covered with a liner 104. The liner 104 consists of a plurality of lining segments 200 (in the following, referred to as segments 200). The liner 104 serves the purpose of protecting the housing 102 against mechanical stress occurring in the inside of the crushing chamber 108 when in use. Each lining segment 200 can be made of a ceramic, or a blend of rubber and ceramics, alternatively, it can also be made of a metallic material, or a blend of rubber and metal.

Figure 2:
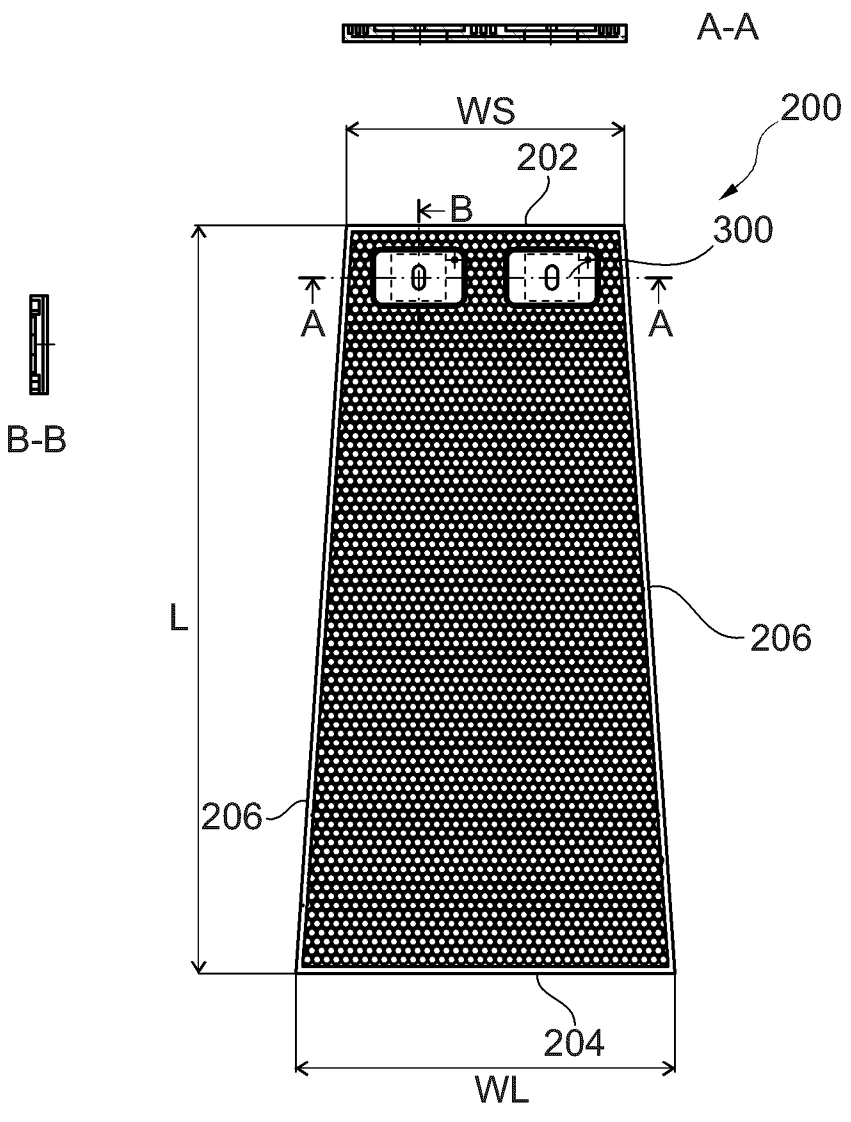
FIG. 2 is a top view of a trapezoidal segment according to a preferred embodiment.

A close-up view of a segment 200 to be mounted inside a crusher as illustrated in FIG. 1 is depicted in FIG. 2.

The segment 200 is generally formed in a trapezoidal shape comprising a short base 202, a long base 204, and two legs 206 connecting the bases. In the depicted segment 200, the angle formed by the long base 204 and a leg 206 is, for example, 86°. It is to be noted that the invention is not limited to this specific value, but any other value can instead be used that enables the segments to slide with respect to each other in an axial direction of the wall of the crusher.

In the preferred embodiment depicted in FIG. 2, there are elongate slot portions 300 provided in the segment 200. The elongate slot portions 300 form through holes in a radial direction of the protective liner, while their elongation direction extends in an axial direction of the crusher when the segments 200 are mounted.

A length L of the segment 200 of the preferred embodiment shown in FIG. 2 as measured from the long base 204 to the short base 202 is 1675 mm, which allows the inside of the crusher to be covered by a single row of liner segments along the relevant range of the crushing chamber 108.

The width WS of the short base 202 and the width WL of the long base 204 are 615 mm and 850 mm, respectively, which allows for forming an angle with the legs 206 as described above. The long base 204 and the short base 202 are substantially parallel to each other.

It is to be noted that both the length L as well as the widths WL and WS are not limited to this specific preferred embodiment, but can be selected according to the dimensions of the crusher.

Figure 3:
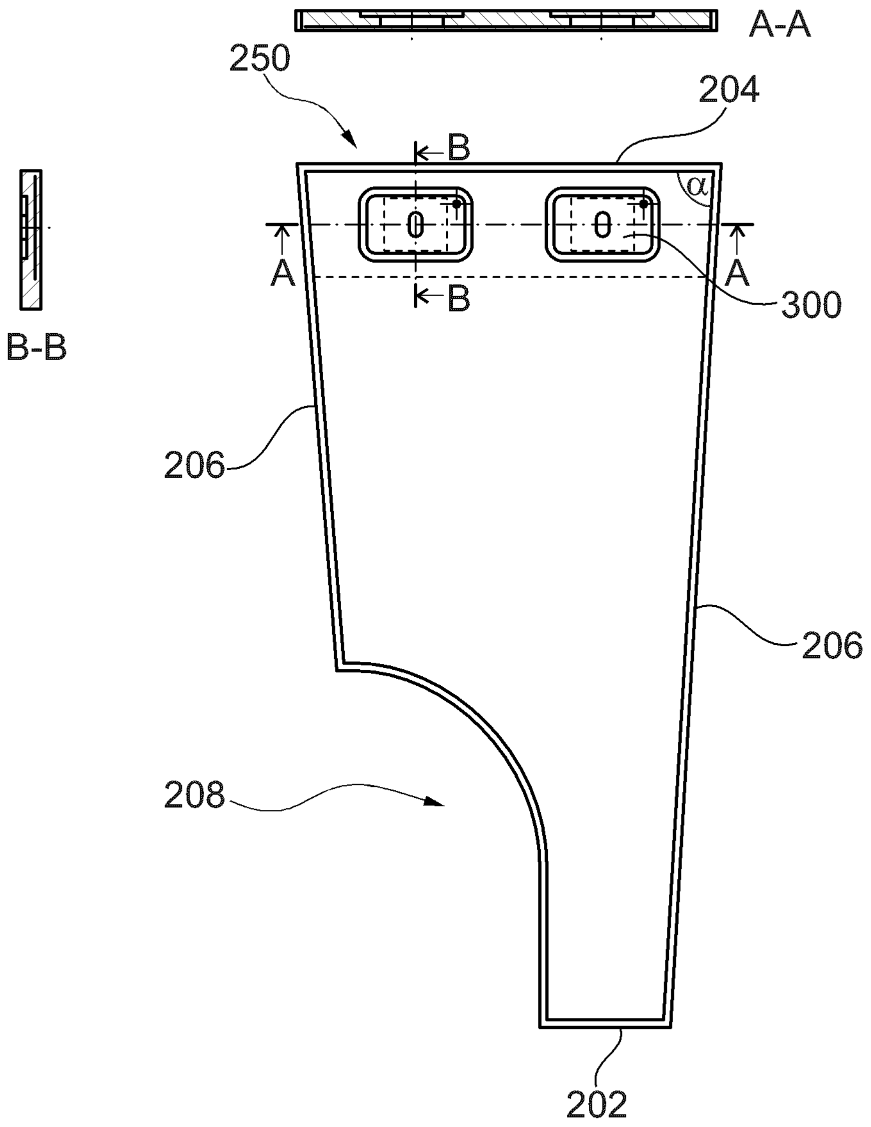
FIG. 3 is a top view of a variation of a trapezoidal segment according a preferred embodiment.

FIG. 3 shows a variation of the segment 250 according to a preferred embodiment of the invention. The segment 250 shown in FIG. 3 is substantially identical to the segment 200 shown in FIG. 2 with the difference that the segment 250 has a recess 208 formed in a corner of the segment 250 to partially accommodate a port 106 of the housing 102. It is to be noted that in this case, the leg 206, that is, the part connecting the recess 208 and the long base 204, is substantially rectilinear, such that this segment 250 also shows the mounting properties of segment 200 illustrated in FIG. 2.

It is further to be noted that the recess 208 shown in FIG. 3 is purely exemplary and other shapes or arrangements are possible. It is for example conceivable that a recess (not shown) is positioned anywhere along leg 206, such that such a recess is neither directly in touch with the short base 202, nor with the long base 204, but rather connected on both sides to the bases via a discontinuous leg 206. However, in this case, the parts of the leg 206 will still be rectilinear in order to ensure the fitting properties of such a segment.

Figure 4:
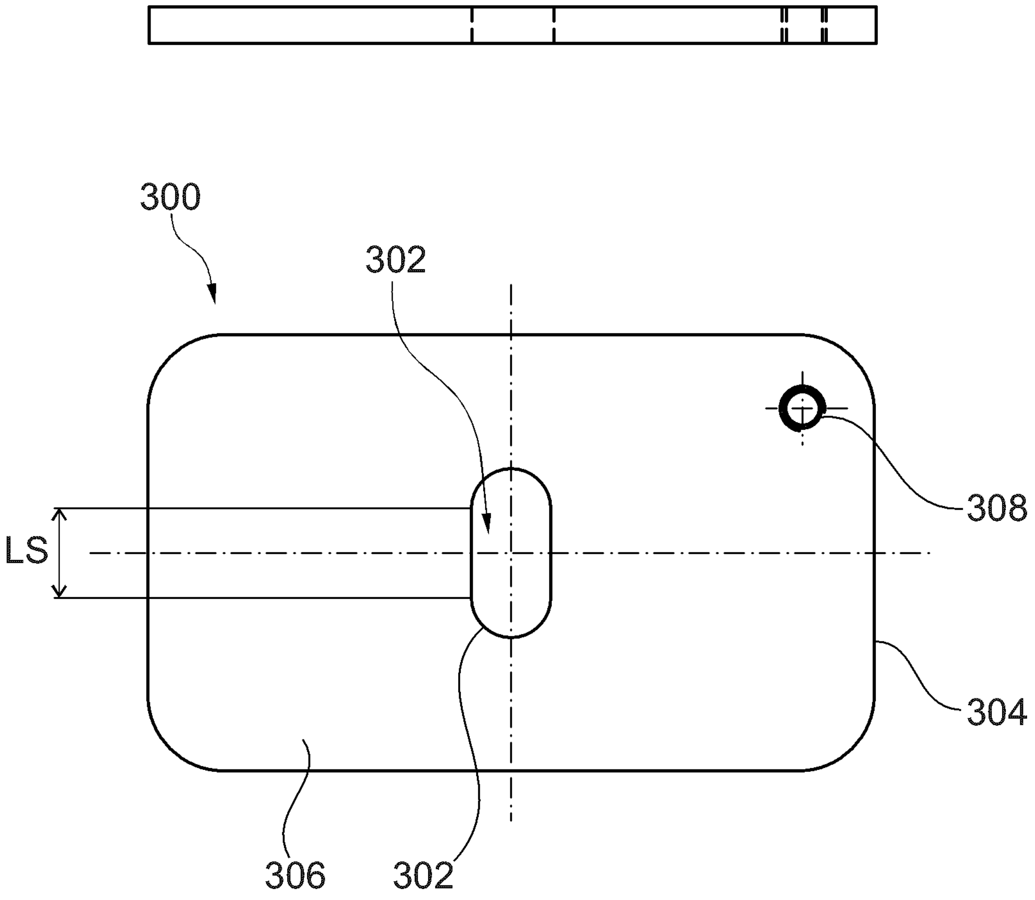
FIG. 4 is a close-up view of an elongate slot of a trapezoidal segment according to a preferred embodiment.

FIG. 4 shows a detail view of an elongate slot portion 300 according to a preferred embodiment of the invention. The elongate slot 302 perforates the segment 200 in a radial direction of the protective liner. The elongation of the slot 302 extends along an axial direction of the protective liner when assembled. In the preferred embodiment shown in FIG. 4, the elongate slot has a length LS of approximately 24 mm in the axial direction, which allows the segment to be moved along this direction when the segment is mounted such that the elongate slot engages with a fixation member such as a bolt or a screw attached to the casing. The width of the elongate slot 302 can be chosen according to the fixation member that is intended to be used with the slot. Note that said fixation member can be configured such that the segment remains unfixed in an axial direction, but is only fixed in the circumferential and radial directions, when the fixation means is not fixed (for example, not tightened in case of a screw). When the fixation member is then fixed (tightened in case of a screw), the segment becomes also fixed in an axial direction.

It is further to be noted that the elongate slot does not have to be configured to be directly formed in the segment 200, rather, the segment can comprise a hole to which a elongate slot member 304 is attached. This is particularly preferred in cases in which the material of the segment 200 comprises a rubber. In this case, the elongate slot member 304 can consist of a plate 306, for example made of metal, in which the elongate slot 302 is formed. This metal plate 306 is then attached to the segment 200, for example via a through hole 308, through which the plate 306 is attached to the segment 200, such that the segment can be attached to the crusher via the plate 306.

Figure 5:
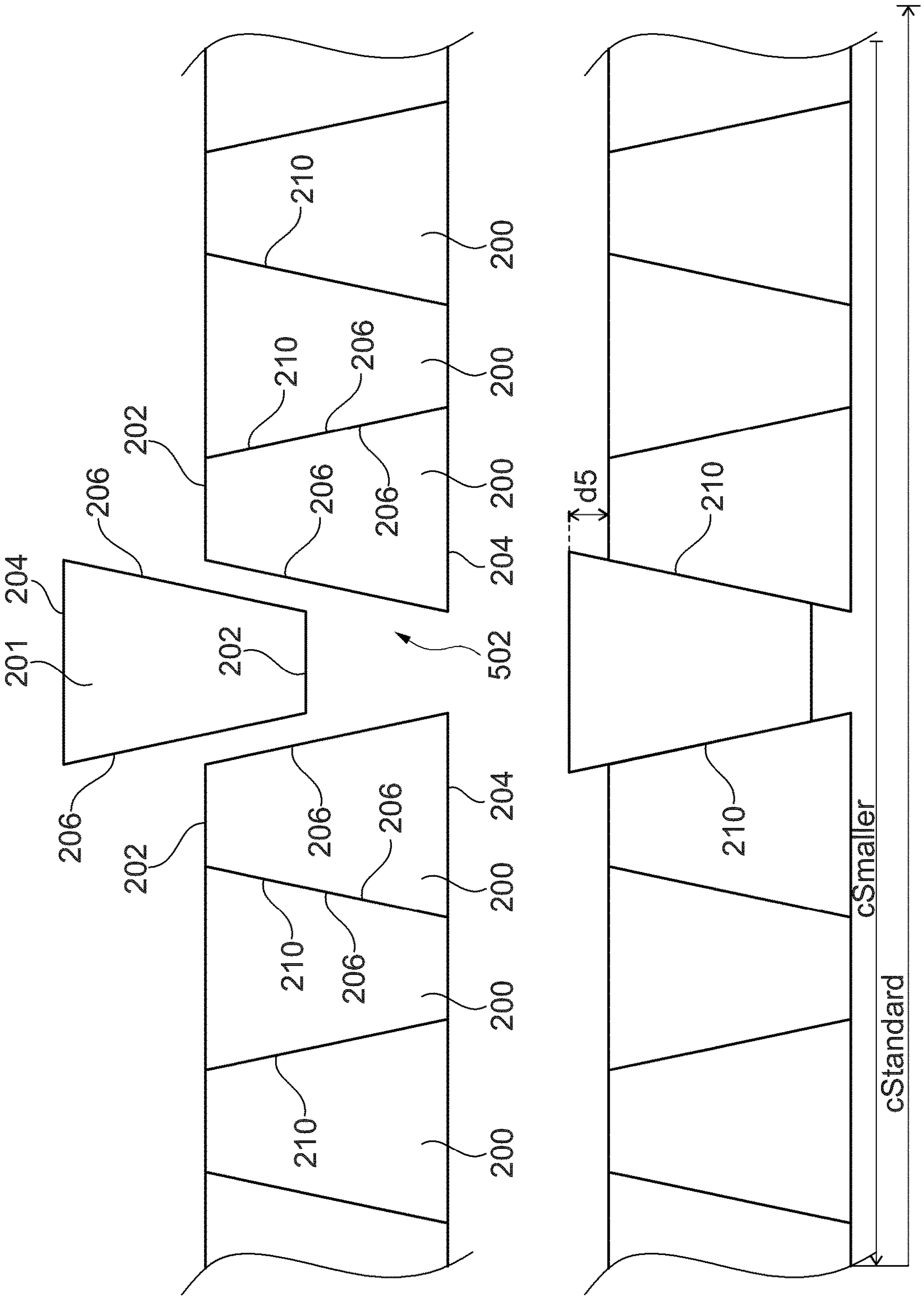
FIG. 5 is a schematic diagram illustrating a method for assembling the protective liner according to a preferred embodiment.
Figure 6:
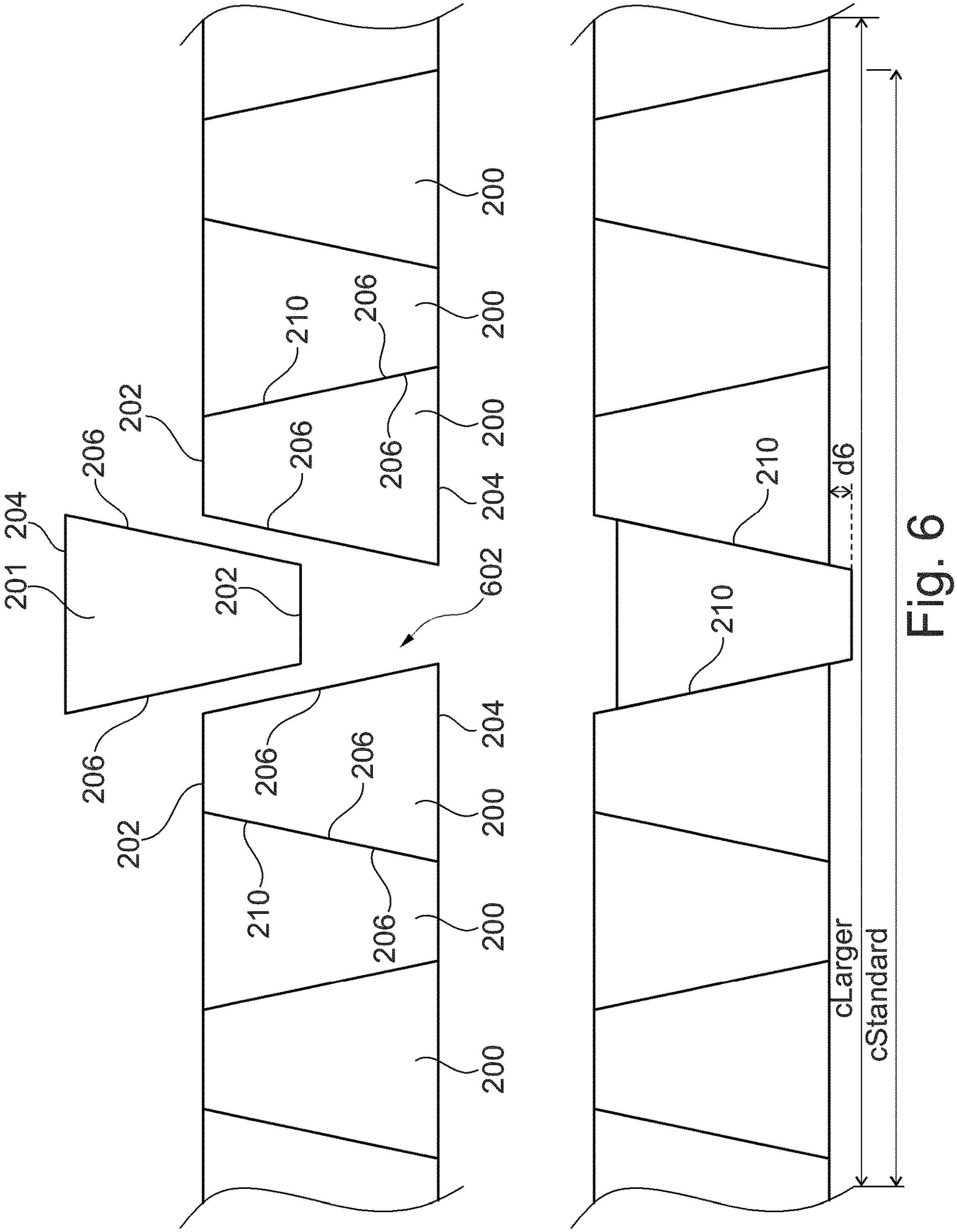
FIG. 6 is a schematic diagram illustrating a method for assembling the protective liner according to a preferred embodiment.

FIGS. 5 and 6 illustrate examples of a method for assembling a protective liner according to a preferred embodiment. The segments 200 are shown in an unrolled view, as seen from the inside of the crushing chamber 108 of the crusher 100.

It is to be noted that the illustrations in FIGS. 5 and 6 are purely illustrative for the method of assembly, and not drawn to scale. Further, the number of segments 200 shown in said figures is not limiting.

FIG. 5 shows a method for assembling the segments 200 in a housing 102, in which the actual diameter of the housing 102 is smaller than a nominal diameter of the housing. This results in a smaller circumference cSmaller than the nominal circumference cStandard to be covered by the segments 200.

According to the preferred embodiment shown in FIG. 5, a plurality of substantially identical segments 200 is arranged along the inside of the circumference of the housing 102, leaving an interval 502 formed by the legs 206 of two segments 200 that are oriented in the same direction, thus forming a downwardly tapered interval 502 between the two segments 200.

It is to be noted that the legs of adjacent segments 200 contact each other at contact positions 210, such that there are only minimal gaps, if any, formed between adjacent segments 200 that result from inevitable production tolerances of the segments 200. Further note that segments 250 with recesses as shown in FIG. 3 and as described with reference thereto are not shown in the embodiment for illustrative purposes, but could equally be used.

In a second step, a further segment 201 is inserted into the interval 502, closing said interval 502, such that the legs of the further segment 201 contact the legs 206 of both adjacent segments 200 at contact portions 210, such that, similar to the above, only minimal gaps remain between the segments 200.

It is to be noted that the further segment 201 protrudes in an axial direction from the row of segments 200 by a distance d5. This distance depends on the deviation between the nominal circumference cStandard of the housing 102 and the actual circumference cSmaller, and the smaller the circumference cSmaller of the housing 102 is, the larger distance d5 becomes.

This protrusion, however, does not significantly affect the performance of the liner since, in this preferred embodiment, there is only one row of liner segments provided, which means that in this embodiment, the bases of the segments do not have to be aligned, e.g. to stack several rows of segments.

Alternatively, it is possible to provide more than one row of segments in the crusher, for example when the protrusion is small, such that the effect on the adjacent row is insignificant, when the segment protrudes to the opposite direction of the adjacent row, or when the rows are provided in a spaced-apart relationship.

Still, in order to provide a sufficient protection function for the interval 502, and to provide a suitable strength of the liner, it is preferred that the distance d5 is smaller than half of the length L of the segment 200.

Now turning to an opposite situation, FIG. 6 shows a method for assembling the segments 200 in a housing 102, in which the diameter of the housing 102 is larger than a nominal diameter of the housing. This results in a larger circumference cLarger than the nominal circumference cStandard to be covered by the segments 200.

According to the preferred embodiment shown in FIG. 6, substantially identical segments 200 are arranged along the inside of the circumference of the housing 102, leaving an interval 602 formed by the legs 206 of two segments 200 that are oriented in the same direction, thus forming a downwardly tapered interval 602 between the two segments 200.

Also here, it is to be noted that the legs of adjacent segments 200 contact each other at contact positions 210, such that there are only minimal gaps, if any, formed between adjacent segments 200 that result from inevitable production tolerances of the segments 200.

In a second step, a further segment 201 is inserted into the interval 602, closing said interval 602, such that the legs of the further segment 201 contact the legs of both adjacent segments 200 at contact portions 210, such that, similar to above, only minimal gaps remain between the segments 200.

It is to be noted that the further segment 201 protrudes in an axial direction from the row of segments 200 by a distance d6, in this case downwards, i.e. to the lower part of the crusher. This distance depends on the deviation between the nominal circumference cStandard of the housing 102 and the actual circumference cLarger, and the larger the circumference cLarger of the housing is, the larger distance d6 becomes.

This protrusion, however, does not significantly affect the performance of the liner since, in this preferred embodiment, there is only one row of liner segments provided, which means that the bases of the segments do not have to be aligned.

Still, in order to provide a sufficient protection function for the interval 602 and to provide a suitable strength of the liner, it is preferred that the distance d6 is smaller than half of the length L of the segment 200.

With the devices and methods as described in the preferred embodiments above, a crusher liner can be provided that can be used to cover housings of different diameters by assembling a plurality of liner segments without the need to cut any liner segment.

The invention claimed is:

1. A crusher having a protective liner, the protective liner comprising a plurality of lining segments which are arranged circumferentially along a wall of the crusher, wherein at least some of the segments have a trapezoidal shape with two bases of different lengths arranged parallel to the circumferential direction of the wall and two non-parallel legs connecting the bases, wherein at least some of the segments are arranged along the circumference of the wall such that long and short bases of adjacent segments alternate, and wherein at least some of the segments are allowed to vary in their axial position with respect to the adjacent segments to compensate for tolerances in a diameter of the wall of the crusher.

2. The crusher according to claim 1, wherein the wall of the crusher is at least partly cylindrical.

3. The crusher according to claim 1, wherein at least one of the segments is movably attached to the wall of the crusher.

4. The crusher according to claim 1, wherein the two non-parallel legs connecting the bases are rectilinear.

5. The crusher according to claim 1, wherein an angle formed between the two non-parallel legs connecting the bases is identical for at least three of the segments of the protective liner.

6. The crusher according to claim 1, wherein the segments comprise a ceramic material, in particular a blend of rubber and ceramic, or wherein the segments comprise a metallic material, in particular a blend of rubber and metal.

7. The crusher according to claim 1, wherein an angle formed by at least one of the two non-parallel legs connecting the bases and the longer one of the bases is between 80° and 89°.

8. The crusher according to claim 1, wherein the longer one of the bases has a length of between 600 mm and 1800 mm, and/or the shorter one of the bases has a length of between 500 mm and 1000 mmm.

9. The crusher according to claim 8, wherein a distance between the bases of the segment is between 200 mm and 2000 mm.

10. The crusher according to claim 1, wherein at least one of the segments has an elongate slot for fixating the segment on a fixation member on the wall of the crusher.

11. The crusher according to claim 10, wherein the elongate slot extends in a direction from the long basis to the short basis of the segment.

12. The crusher according to claim 1, wherein a diameter of the crusher is between 800 mm and 4500 mm.

13. The crusher according to claim 1, wherein an angle formed between the two non-parallel legs connecting the bases is identical for all of the segments of the protective liner.

14. The crusher according to claim 1, wherein an angle formed by at least one of the two non-parallel legs connecting the bases and the longer one of the bases is between 83° and 88°.

15. The crusher according to claim 1, wherein an angle formed by at least one of the two non-parallel legs connecting the bases and the longer one of the bases is equal to 86°.

16. A method for assembling a protective liner in a crusher having a protective liner, the protective liner comprising a plurality of lining segments arranged circumferentially along a wall of the crusher, wherein at least some of the segments have a trapezoidal shape with two bases of different lengths arranged parallel to the circumferential direction of the wall and two non-parallel legs connecting the bases, wherein at least some of the segments are arranged along the circumference of the wall such that long and short bases of adjacent segments alternate, and wherein at least some of the segments are allowed to vary in their axial position with respect to the adjacent segments to compensate for tolerances in a diameter of the wall of the crusher, the method comprising:

a first step of attaching at least two segments to the wall of the crusher, such that an interval along the circumferential direction of the wall is defined between two segments of the crusher, wherein the wall is not covered by any segment in the interval; and a second step of inserting a further segment into the interval and adjusting the position of the further segment in an axial direction of the wall so that the wall of the crusher is covered with segments arranged along the circumferential direction of the wall, such that the non-parallel legs of the adjacent segments at least partially contact each other.

17. The method according to claim 16, wherein the interval defined in the first step has an average width as measured in the circumferential direction of the wall that is larger than a length of the shorter one of the bases of the further segment and smaller than a length of the longer one of the bases of the further segment, and/or wherein the width of the interval defined in the first step as measured in the circumferential direction of the wall half way between the long base and the short base is larger than a length of the short one of the bases of the further segment and smaller than a length of the long one of the bases of the further segment.

18. The method according to claim 16, wherein the method further comprises:

a step of positioning the at least one elongate slot on at least one fixation member such that the segment having the elongate slot can be moved substantially only in the direction of elongation of the elongate slot, and fixating the segment by means of the fixation member and the elongate slot when the segment is at a desired position in the axial direction.

19. The method according to claim 16, wherein, in the first step, the at least two segments are attached to the wall of the crusher in an orientation of the shorter ones of the two bases facing upwards along the axial direction of the wall, and the longer ones of the two bases facing downwards along the axial direction of the wall, such that the interval between the two segments is tapered downwards to hold the further segment.

* * * * *